(No Model.)

H. M. HANDSHY.
CHEESE KNIFE.

No. 363,822. Patented May 31, 1887.

WITNESSES:
H. N. Price
W. T. Shepherd

INVENTOR.
Henry M. Handshy.
By his Attorney, C. C. Shepherd.

UNITED STATES PATENT OFFICE.

HENRY M. HANDSHY, OF COLUMBUS, OHIO.

CHEESE-KNIFE.

SPECIFICATION forming part of Letters Patent No. 363,822, dated May 31, 1887.

Application filed June 10, 1886. Serial No. 204,700. (No model.)

*To all whom it may concern:*

Be it known that I, HENRY M. HANDSHY, a citizen of the United States, residing at Columbus, in the county of Franklin and State of Ohio, have invented a certain new and useful Improvement in Cheese-Knives, of which the following is a specification.

My invention relates to improvements in cheese-cutting knives wherein a knife-blade made to project at right angles with a vertical stem or post fixed at a point outside the cheese-board may be raised or lowered by means of levers; and the objects of my invention are, first, to provide an effective cheese-cutting device of this class of simple and neat construction, and to produce the same at a low cost of manufacture; second, to dispense with more than one bearing-post for the attachment of the operating-levers; and, third, to so construct the device as to automatically arrest the descent of the knife when the cheese has been cut half through, and to provide means for holding the knife above the cheese when not in use. These objects I accomplish in the manner illustrated in the accompanying drawings, in which—

Figure 1:
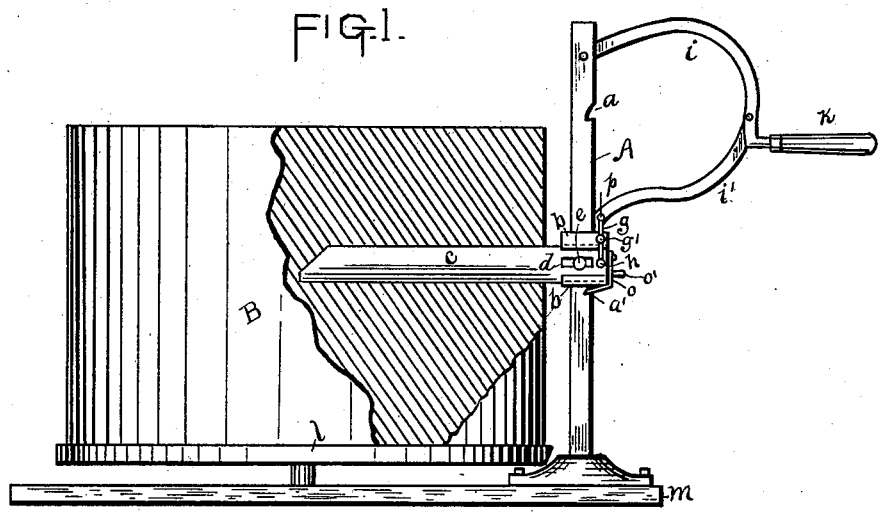
Figure 2:
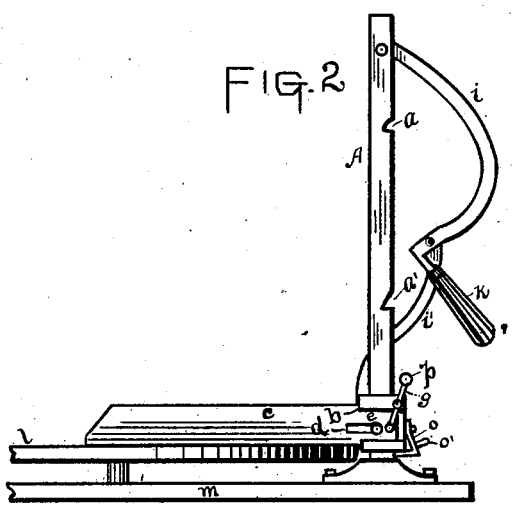
Figure 3:
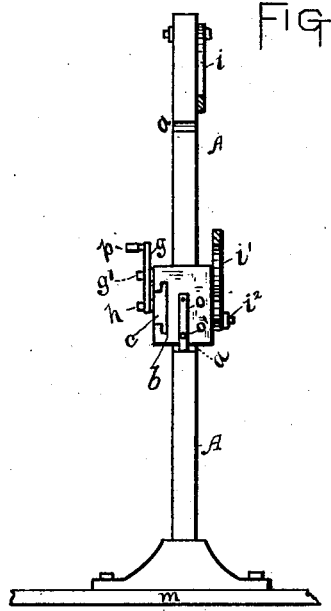
Figure 4:
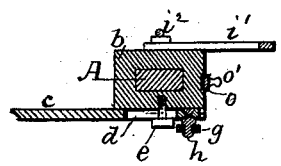

Figure 1 is a side elevation of my device, showing the position of the knife-blade when the cheese has been half cut through. Fig. 2 is a side elevation showing the knife-blade resting on the cheese-board. Fig. 3 is a rear side elevation, enlarged, with the operating-levers in section. Fig. 4 is a horizontal section through the post, the knife-bearing block, and its attachments.

Similar letters refer to similar parts throughout the several views.

$m$ represents the cheese-box bottom or base-board, provided on one side with a slight extension, on which is screwed or otherwise secured the flanged base of a vertical post or stem, A, which is of a length sufficient to project above the top of a large-sized cheese when the latter is seated in the usual manner on the revolving cheese-disk $l$. A knife-bearing block, $b$, is loosely mounted on the stem A, the latter passing through a central perforation in the said block. On one side of the block $b$ is formed a transverse depression, which is made slightly T-shaped by being partially covered by the surface metal of the block. Within this depression is loosely fitted the rear end of a knife-blade, $c$, which may be inserted longitudinally therein from the front or rear of the post. That portion of the knife-blade bearing against the block is provided with a slot, $d$, through which is made to pass a pin, $e$, having a flanged head and its end screw-threaded to admit of its being adjustably secured in a screw-hole formed in the block.

On the opposite side of the stem and near the top thereof is loosely pivoted the end of a lever, $i$, which, extending outwardly and downwardly in a curved line and thence again outwardly, is provided on its outer end with a suitable handle, $k$. To the lower end of this curved lever is loosely pivoted the upper end of an inwardly and downwardly curved lever, $i'$, the lower end of which is pivoted to a short pin, $i^2$, made to project from the side of the block $b$. By raising or pressing down upon the handle $k$ the knife-blade is thus made to ascend or descend at the will of the operator.

In order to hold the knife-blade above the cheese in position for immediate use, I provide a thin metal strip having its upper end riveted to the rear side of the block and having its lower end bent forward to bear against the rear side of the stem A, said lower end being adapted to drop into a notch, $a$, in the rear side of the stem and prevent the knife descending until withdrawn from the notch, which is readily accomplished by pulling on the knob $o'$. A similar notch, $a'$, is formed in the stem at such point as to catch the spring-strip $o$ in its descent and prevent the knife from passing the center of a large cheese in case it is desired to cut but half-way through the same.

Made to project outward from the hilt of the knife-blade immediately in rear of the slot $d$ is a short pin, $h$, to which is pivoted the lower end of a short lever, $g$. The latter, extending upward and being again pivoted at about the middle of its length to a similar pin, $g'$, made to project from the upper portion of the block, is provided on its outer end with a button or short projecting handle, $p$. The knife, having descended until it rests on the board $l$, may, as shown in Fig. 2 of the drawings, be made to slide backward and forward with a sawing motion to sever the cheesecloth (in case it is not cut by the direct pressure of the knife) by working the handle $p$ back and forth.

I am aware that a cheese-cutting device in which a knife-bearing block has been made to slide within a slotted vertical stem has been used, and that the same has been operated by means of levers, one of which has been pivoted to a second bearing-post; but my invention differs from this in many points of construction.

Having now fully described my invention, what I claim, and desire to secure by Letters Patent, is—

1. In a cheese-cutting device, the combination, with a vertical post or stem made to project from the cheese-box bottom $m$, of the knife-bearing block $b$, carrying the projecting knife-blade $c$, and the connecting operating-levers $i'$ and $i$, the latter being pivoted to said vertical stem, and the former being pivoted to the bearing-block $b$, substantially as and for the purpose specified.

2. The combination, with a vertical post or stem made to project from the cheese-box bottom or base-board, and having stop-notches $a$ $a'$, of the knife-bearing block $b$, carrying the projecting knife-blade $c$, the connecting operating-levers $i$ $i'$, pivoted, respectively, to the upper end of the post A and side of the block $b$, and the metal spring-strip $o$, adapted to drop into the notches $a$ $a'$, substantially as and for the purpose specified.

3. The combination of knife-bearing block $b$, having a transverse T-shaped depression, a central perforation and projecting pin, $g'$, with a slotted knife-blade, $c$, held within said depression, and having a projecting pin, $h$, and the upwardly-projecting lever $g$, pivoted on said pins $h$ and $g'$, substantially as and for the purpose specified.

HENRY M. HANDSHY.

Witnesses:
H. N. PRICE,
W. S. SHEPHERD.